L. Boardman,
Polishing Spoons.
No. 399. Reissued Oct. 7, 1856.
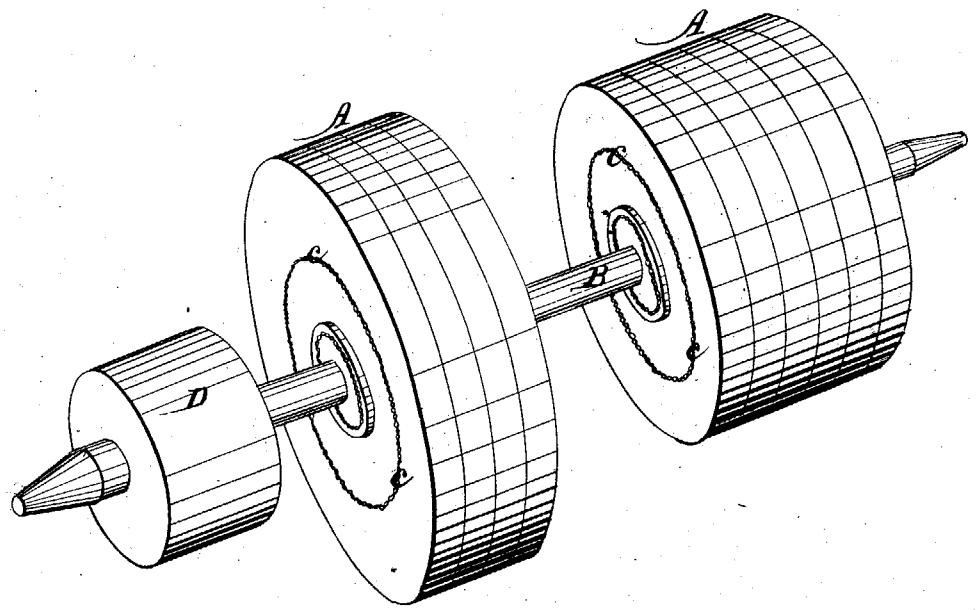
N. PETERS, PHOTO-LITHOGRAPHER, WASHINGTON, D. C.

UNITED STATES PATENT OFFICE.

LUTHER BOARDMAN, OF EAST HADDAM, CONNECTICUT.

IMPROVEMENT IN BUFFS FOR POLISHING SPOONS AND OTHER ARTICLES.

Specification forming part of Letters Patent No. 3,380, dated December 15, 1843; Reissue No. 399, dated October 7, 1856.

*To all whom it may concern:*

Be it known that I, LUTHER BOARDMAN, of East Haddam, in the county of Middlesex and State of Connecticut, have invented certain new and useful Improvements in the Manner of Forming Circular Buffs of Leather for the Polishing of Spoons of Britannia Metal, and other articles of a like character; and I do hereby declare that the following is a full and exact description thereof, reference being had to the accompanying drawing, which represents in perspective two of the buffs arranged on a shaft.

The nature of my invention consists in allowing the outer portions of the buff to be perfectly free from each other, so as to yield at the edges, and adapt themselves more perfectly to the form of the article held against said edges.

To enable others skilled in the art to make and use my invention, I will proceed to describe the same with reference to the drawing.

I take leather, suitably tanned and dressed for the purpose, and cut it into disks or rings of a diameter equal to that of the buff required. These disks or rings I place together, so as to make the required thickness or length of buff upon its shaft. I then secure the disks or rings firmly together near their centers, so that they may be firmly united to the shaft on which they are to run, and leaving the respective pieces of which the buff is composed loose in every other part. Through the center of the buff thus formed I make a hole to receive a spindle adapted to the polishing-lathe, securing the buff to said spindle in such manner as that it shall not turn thereon.

The buffs thus formed have the pieces of leather of which they are composed perfectly free from each other, excepting where they are united near their centers, and in consequence thereof they operate very differently from such as have the respective pieces of leather of which they are formed joined together by glue or other cement, or forced together by unyielding heads. The buffs as I make them will yield at the edges, and will adapt themselves more perfectly to the form of the article held against them than when made in any of the modes heretofore adopted. The polish produced by my buffs is more rapid and more perfect. It is a polishing and not a cutting or scratching process, such as is invariably the case when the perimeter of the buff is stiffened or hardened or restrained in any manner. Besides this, the allowing of the perimeters of the disks or rings to be perfectly free from each other makes them adaptable to the irregular surfaces of a spoon or fork, and they will better carry and retain the polishing material.

In the use of these buffs it is necessary to give them a very rapid motion, (from three thousand to five thousand revolutions per minute,) and the centrifugal force generated by this rapid motion causes the edges of the disks to stand out with a degree of rigidity that is abundant for perfect polishing without cutting or scratching, while it does not prevent that yielding which is necessary to their proper action. So much so is this the case that leather which is "flappy" and "hangs" when the buff is not in motion will, when set in high speed, immediately straighten out and become in a degree firm, to resist the article placed against it.

In the accompanying drawing, A A are two such buffs of leather upon a spindle, B. The circles are united rigidly, as at *c c*. D is a pulley for the band which is to give motion to the buffs. From *c* to their perimeters the disks are perfectly free and loose.

Having thus fully described the nature of my invention, what I claim therein as new, and desire to secure by Letters Patent, is—

A cylindrical buff composed of soft-leather disks or rings, when the outer portions of said disks are left perfectly free from each other, so as to admit of the yielding necessary to their proper action, substantially as herein described.

LUTHER BOARDMAN.

Witnesses:

A. B. STOUGHTON,

THOS. H. UPPERMAN.